July 9, 1957

G. BOSCO ET AL 2,798,923

CIRCUIT INTERRUPTER

Filed Jan. 26, 1954

INVENTORS
Giuseppe Bosco &
Ernesto Maggi.
BY
Ralph H. Swingle
ATTORNEY

July 9, 1957

G. BOSCO ET AL 2,798,923

CIRCUIT INTERRUPTER

Filed Jan. 26, 1954

United States Patent Office 2,798,923
Patented July 9, 1957

2,798,923
CIRCUIT INTERRUPTER

Giuseppe Bosco and Ernesto Maggi, Bergamo, Italy, assignors to Westinghouse Electric Corporation, East Pittsburgh, Pa., a corporation of Pennsylvania Application January 26, 1954, Serial No. 406,218

Claims priority, application Italy January 30, 1953

21 Claims. (Cl. 200—150)

The present invention relates to circuit interrupters in general, and, more particularly, to arc-extinguishing structures therefor.

A general object of our invention is to provide an improved piston arrangement for a circuit interrupter of the liquid-break type.

Another object is to provide an improved venting arrangement for the arc-extinguishing unit of a liquid-break type of circuit interrupter.

Still a further object is to provide an improved relief valve arrangement, which preferably is used in conjunction with an improved cooling chamber construction to assist in cooling the contaminated liquid and gases which are ejected from the arc-extinguishing unit of a circuit interrupter.

The present invention is particularly concerned with high tension circuit breakers, particularly those of the so-called oil-poor type. It constitutes a considerable improvement over existing breakers of the same kind.

One of the general objects of the present invention is to provide an oil circuit breaker capable of rapidly interrupting both capacitive and inductive low-amperage currents which are very much out of phase, while withstanding the excess voltages created at the instant of interruption. Also the improved breaker is capable of interrupting high-amperage short-circuit currents at high voltage.

Another object is to limit the excess voltage peaks produced at the moment the electric circuit is broken, preventing the violent interruption of the arc.

Another object is to provide a circuit breaker able to close the circuit immediately after an opening operation caused by a short circuit, and eventually, if the fault persists to open the circuit breaker again.

Also the present invention has for its object the provision of a device to cool and discharge the gases formed inside the breaker every time the breaker opens.

More precisely, and according to another aspect of the present invention, a cooling device is installed above the interrupting chamber of the breaker. This cooling device cools and deionizes the oil vapors developed by the effect of the electric arc which is established each time the breaker opens and while it permits the return of the cooled oil to the breaker tank it permits the discharge of residual vapors. This avoids the possibility that oil, contaminated by arcing or otherwise, may drain to the outside of the breaker and run along its walls, with the danger of causing external electrical discharges.

In the circuit breaker covered by the present application, and with the intent of putting between the contacts, while they are open, such a means which is able to withstand the high peaks of the recovery voltage every time the current passes through the zero value, the interrupting chamber is made in such a way as to let fresh liquid, in an un-ionized state, flow to the various points of the zone of the interrupting arc, and also to withdraw or to extract from the interrupting arc the liquid which has already become contaminated.

In order to obtain this action in the interrupting chamber, multiple oil injections are used. These injections have a transverse direction to the main arc. Suitable openings for the discharging of the oil and the ionized gases (also arranged in a transverse direction to the arc) are arranged as to be alternated with the inwardly directed jets, but offset horizontally at an angle of 90° with respect to the mentioned jets.

Thus a mixture of vapors, minute oil drops, and ionized gases, all in a state of great turbulence is obtained within the zone of the interrupting arc, which will possess a high degree of dielectric strength due to the considerable surrounding ambient pressure.

The pressure generated by an auxiliary or a pressure-generating arc, in a small pressure-generating chamber located above the interrupting arc, is utilized for the interruption of currents of high value, to force the oil contained in lateral conduits into the interrupting zone of the main interrupting arc. For currents of lower value to be interrupted, the pressure generated by the pressure-generating arc is no longer sufficient, and it has been found useful to use an auxiliary piston which provides the oil contained in the interrupting chamber with a certain adequate pressure of the requisite degree. In any case, this piston is indispensable for the washing or flushing of the interrupting chamber, and thereby permits the immediate closing of the breaker. In fact, it draws the oil from a region of the breaker where usually the oil is in a better conserved condition, both immediately after any interruption and during any interruption. It pumps it into the chamber in a greater quantity than that contained in it, and in a time which is approximately equal to that used by the movable contact to reach the end of its path.

Before the breaker closes, the interrupting chamber is, therefore, ready for a subsequent cycle of operations. The pumping of the oil is, in the case of low-amperage currents, properly delayed in order to prevent violent interruption of the arc with accompanying surges.

Furthermore, and in order to improve the interruption, in the case of low-amperage currents greatly out of phase, a notable improvement has been added by the movement of the upper contact accomplished by means of an insulating operating rod actuated by the controlling crank mechanism of the main current carrying movable rod contact. Thus the break velocity of the contacts in the initial portion of the opening operation is going to be practically doubled. Furthermore, the movements pertaining to the upper and lower contacts become more steady and constant in relation to the central contact, which is only permitted a very short movement.

The foregoing objects and improvements of the present application will readily be apparent, and others will be made understandable upon a reading of the following specification taken in conjunction with the attached drawings, in which.

Figure 1:
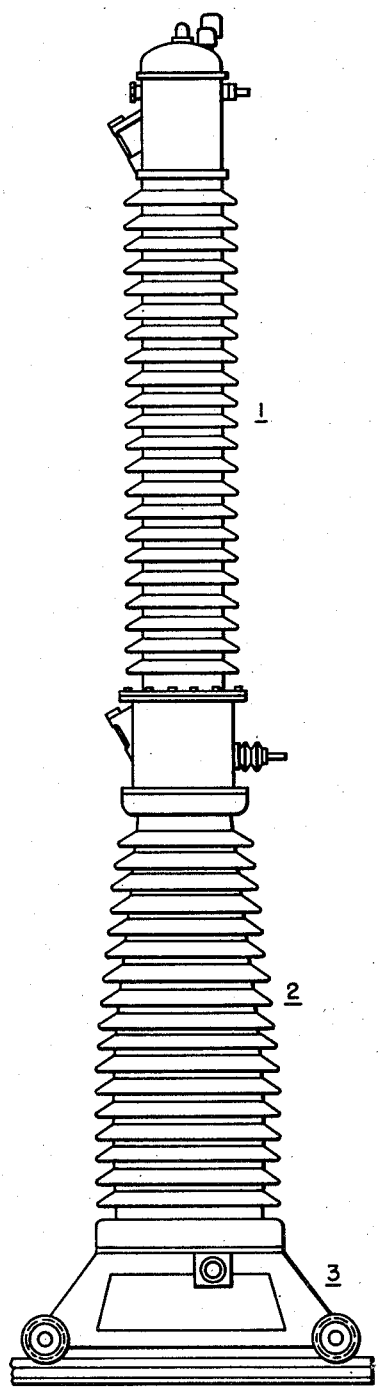
Figure 1 is a side elevational view of a pole of a circuit breaker embodying the invention.

Referring to the drawings, and, more particularly, to Fig. 1 thereof, it will be observed that Fig. 1 shows an elevational view of a pole of a circuit breaker embodying the present invention complete with an upper upstanding part 1, a lower supporting part 2, and a truck 3, under which may be installed the solenoid, electro-pneumatic or any other suitable type of control equipment.

Figure 2:
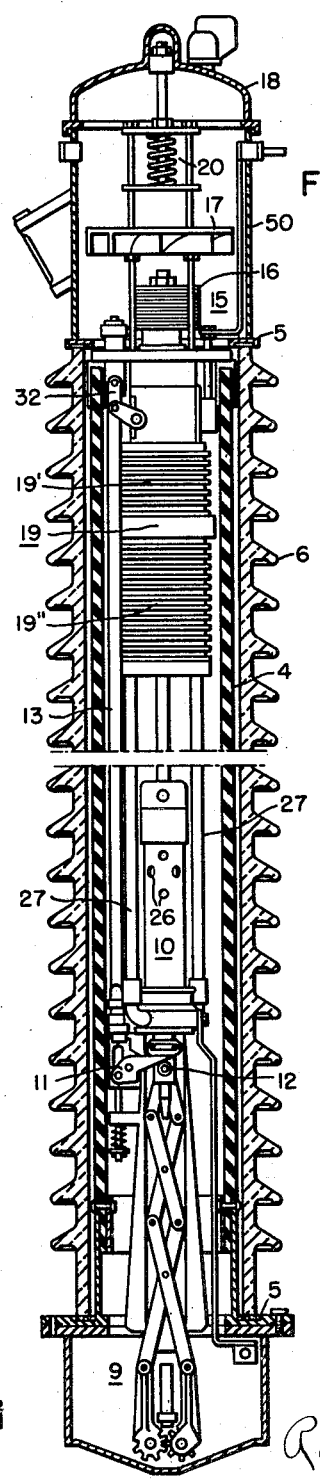
Fig. 2 shows a cross section through the upper portion of the pole in Fig. 1 with the elements drawn to a larger scale than used in Fig. 1.

The interruption chamber, or arc-extinguishing unit, is contained in the upper part 1, and Fig. 2 illustrates a cross-sectional view through the same. It is supported by a main insulating cylinder 4, the end metallic flanges of which maintain the insulator 6 tight between the washers 5.

Each pole of the interrupter embodying the present invention contains the following internal parts, a lower movable contact 7, being a portion of a rod-shaped movable contact assembly, a movable upper contact 14, and an intermediate contact 60 which is permitted to make only a very short vertical displacement. The interrupting zones or regions between contacts 14 and 60, and 7 and 60, are inside the interruption chamber, or arc-extinguishing unit, which is divided into two parts. There is provided an upper compression chamber where a pressure-generating arc is produced and a lower interrupting chamber in which the opening between contacts 60 and 7 takes place. Beneath this interrupting chamber or arc-extinguishing unit is provided an oil pump, or piston device 10, which is traversed and actuated by the lower movable interrupting contact rod 7, as will be explained hereinafter. Below such pump are provided the control and operating mechanism of the breaker whose structure and operation will be also described hereinafter.

Figure 3:
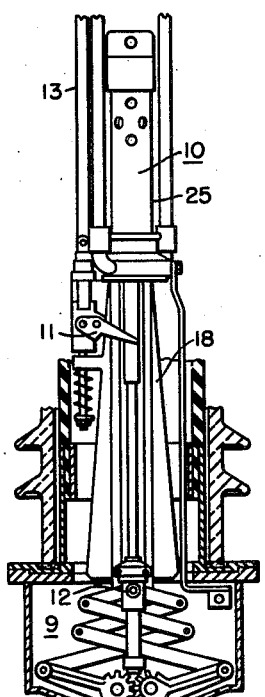
Fig. 3 shows a portion of the mechanism illustrated at the lower end of Fig. 2, with the parts in the open-circuit position.

The action from the control device to the movable contact rod 7 is transmitted by means of an insulating bar and a lever with toothed and engaging head, and by a pantograph, shown in Figs. 2 and 3, respectively, when the breaker is in the closed and in the open position. As it may be seen in the aforementioned drawings, the pantograph operates the main movable contact rod 7, and this during its translation movements loads pump 10, and by means of two rollers 12, operating levers 11, actuates the lateral insulating operating rod 13, which transmits the movement to the upper contact 14.

Completing the pole is the gas-exhausting valve 15 with related shock absorber and cooler 16 with deflector 17, whose purpose is to prevent the exhaust of oil from the lid or cover 18.

Figure 5:
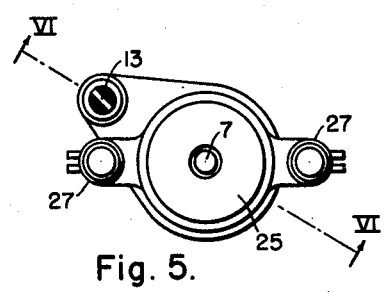
Fig. 5 is a plan view of the piston device of Fig. 4.
Figure 4:
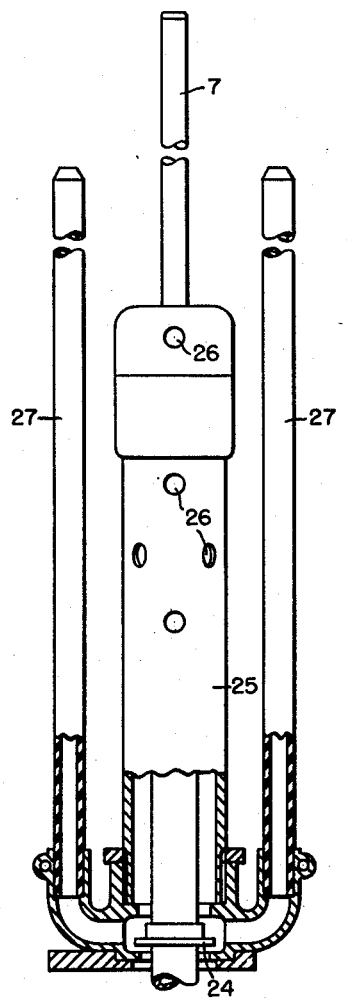
Fig. 4 shows a side elevational view, partially in vertical section, of the oil pump and pertaining conduits.
Figure 6:
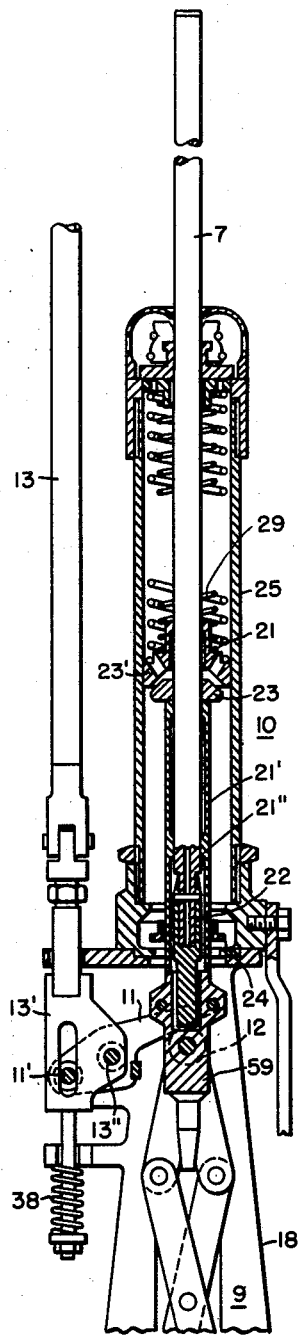
Fig. 6 shows a vertical sectional view through the piston device taken substantially along the line VI—VI of Fig. 5, looking in the direction of the arrows with the contact structure indicated in the closed circuit position.
Figure 8:
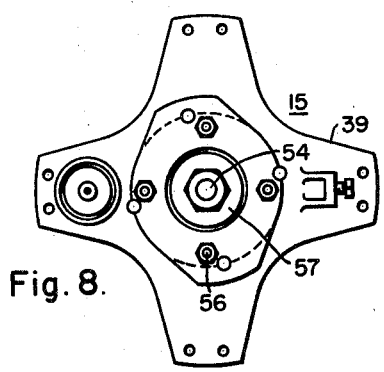
Fig. 8 is a plan view of Fig. 7.

Figs. 4, 5 and 6 show the constructional details of the piston 21 of oil pump or piston device 10, and its operation by means of the main movable contact rod 7. This contact rod 7, after having reached two-thirds of its path meets piston 21 with conical shock absorber 22, and pushes the piston 21 against springs 29 thereby compressing them.

Two valves 23, 24, the former located over the piston 21 and the later being disposed at the bottom of the chamber 25 permit the entrance of oil into chamber 25 and prevent the building up of a vacuum. Holes 26 in the upper section of the wall of the chamber 25 help the exit of the oil through the upper part of the pump 10. Both of these refinements were necessary in order to prevent too strong a closing effort during the closing of the interrupter.

During the opening operation, the main movable contact rod 7 moves independently of piston 21, which pumps the oil into two insulating conduits 27. These conduits 27 connect the cylinder casing 25 with the interrupting chamber or arc-extinguishing unit 19.

Figure 7:
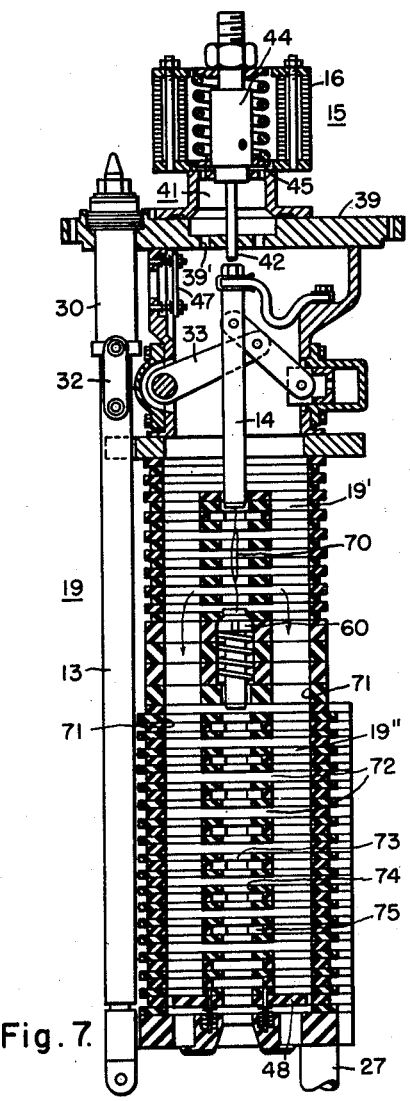
Fig. 7 shows an enlarged vertical sectional view through the upper portion of the interrupter illustrated in Fig. 2, the view illustrating also a portion of the conduit leading to the piston device, with the contact structure being illustrated in the open circuit position.

Figs. 6 and 7 clearly show the mechanism for transmitting movement from the pantograph 9 to insulating operating rod 13 which controls movement of the upper contact 14.

The two rollers 12, located at the upper end of the pantograph 9 and linked also with the main current contact rod 7 slide in their guide along supports 18 and when they have traversed approximately nine-tenths of their travel they hit two levers 11 pivoted stationarily at 11'. These levers through which pass pins 13" of part 13' rigidly fastened to operating rod 13 effect the raising of insulating operating rod 13 itself. The impact is not excessively violent since it takes place at a certain inclined angle.

In order to understand the operation of the mechanism, it is necessary to refer to Fig. 2 and examine the successive location of the various contacts during the closing operation. The main movable contact rod 7, during its upward stroke, pushes upper contact 14 downwardly, through lateral operating rod 13. Upper contact 14 reaches intermediate contact 60 and pushes it a fraction of an inch downwardly until it meets lower contact rod 7, which displaces the two upper contacts 14, 60 upwardly as much as necessary to obtain a sufficient compression between the contacts themselves.

The structure and operation of pump 10 are clearly shown in Figs. 4, 5 and 6. Fig. 6 shows how member 59, which is part of a shock absorber associated with movable contact rod 7, pivots rollers 12. These, as said before, control insulating operating rod 13 which operates upper contact 14. Movable contact rod 7 runs inside piston 21 of pump 10. This piston is made of a tubular part 21' and a truncated-conic part 21 constituting the piston itself. Valve 23 is also a part of the piston. This valve is capable of closing holes 23' existing in piston part 21 and is so made as to permit the entry of oil into the lower part of cylinder 25 of pump 10 when the circuit breaker is switched into closed position.

Current-carrying contact 7 terminates adjacent its lower end with a steel conical piece 22 screwed and pinned to the contact rod 7 itself. The tubular part 21' of the piston is provided at a certain point, interiorly thereof, with constriction 21'' which is then in engageable connection with conical part 22, mentioned above and whose function will become clear hereinafter. When the circuit breaker is switched into the closed position, contact rod 7 easily moves for a certain distance inside piston 21, but as soon as it has traversed three-fourths of its path of travel, it carries the piston along. This piston compresses springs 29 and ejects some oil through the upper part of cylinder 25 and by means of valves 23, 24 causes the filling of the upper portion of the pump. The carrying along of the piston takes place without any impact, inasmuch as in the hollow space existing underneath constriction 21'' (between the interior wall of tubular part 21' of the piston and conical part 22) there is some oil which forms a cushion, which deadens the impact of part 22 against projection 21' of the piston. Therefore, the movement takes place easily and without any impact which might endanger the life of the apparatus.

Pump 10 is placed in a location where the oil contained within the circuit breaker is in the best conserved condition and has a high dielectric strength. Any contaminated oil that might be in the interrupting cell 19 cannot be suctioned back through the conduits 27 because of the automatic closing of valves 49 installed in the conduits 27. The closing of the valves 49 takes place automatically because of the vacuum caused by the reduced pressure generated in the lower portion of the pump 10 by the upward movement of piston 21.

When the circuit breaker opens again, piston 21 goes down and closes valves 23 and 24. Hence, with a certain delay, which may be controlled, the piston 21 pumps fresh oil into both the upper pressure-generating chamber 19' and the lower interrupting chamber 19'' through conduits 27 and valves 49. This operation of the pump takes place, of course, in such cases when the current that is interrupted in the circuit breaker is of not too high a value. In the case of the interruption of larger currents, the pressure generated by the arc within chamber 19' is greater than that generated in the pump 10, and, therefore, the oil contained in chamber 19' is forced by this pressure into the interrupting chamber 19'' below, while the valves 49 are being closed. In this case also, when the pressure inside chambers 19' and 19'' has dropped below a certain stage, valves 49 open since the pressure of the pump is greater than that existing in chambers 19', 19''. The pump 10 then starts its operation and sends fresh oil into cell or arc-extinguishing unit 19. This accomplishes the washing of cell 19 and leaves it in optimum condition for the next operation of the circuit breaker.

Figure 9:
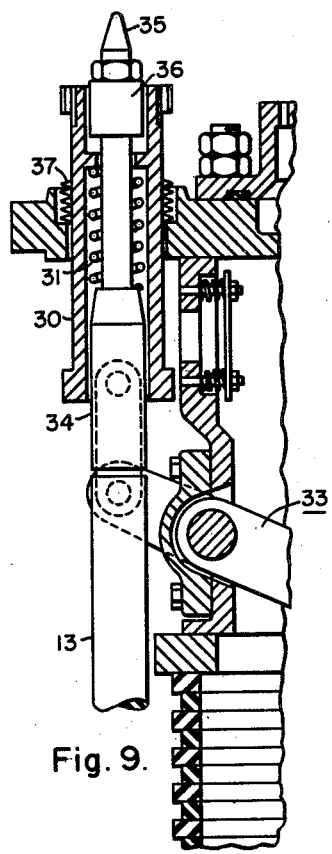
Fig. 9 shows a substantially vertical section taken through the upper end of the side operating rod controlling the movement of the upper contact, with the parts being indicated in the closed circuit position.

The movement of insulating operating rod 13 to upper contact 14 is transmitted, as can be seen in Figs. 7 and 9 by sleeve 30, spring 31, which gives elasticity to this mechanism, links 32 and by an assemblage of levers 33. The operating rod 13 carries a screwed-in conical end piece 34, which extends into head 35. Screwed over this is piston 36. Conical element 34 has the purpose of preventing bouncing at the upper contact 14 while the circuit breaker closes. Piston 36 with conical washers 37 and shock absorber 44, hereinafter described, has the purpose of cushioning the impact caused by the springs 31 and 38 while the circuit breaker opens.

Fig. 6 shows the other end of operating rod 13 actuated through levers 11 by pantograph 9 without the presence of any springs.

Operating rod 13 extends with its upper metallic part beyond plate 39 of arc-extinguishing unit 19 so as to provide the surest support. The movement of levers 33 and contact 14 is evident through the examination of Figs. 7 and 19.

Fig. 7 shows clearly too, plate 39 which fastens the arc-extinguishing unit 19 to the insulating pipe 4. This plate 39 is thick and has large apertures which are purposely arranged as to let the exhausting gas from the interrupting chamber move freely upwardly.

Figure 19:
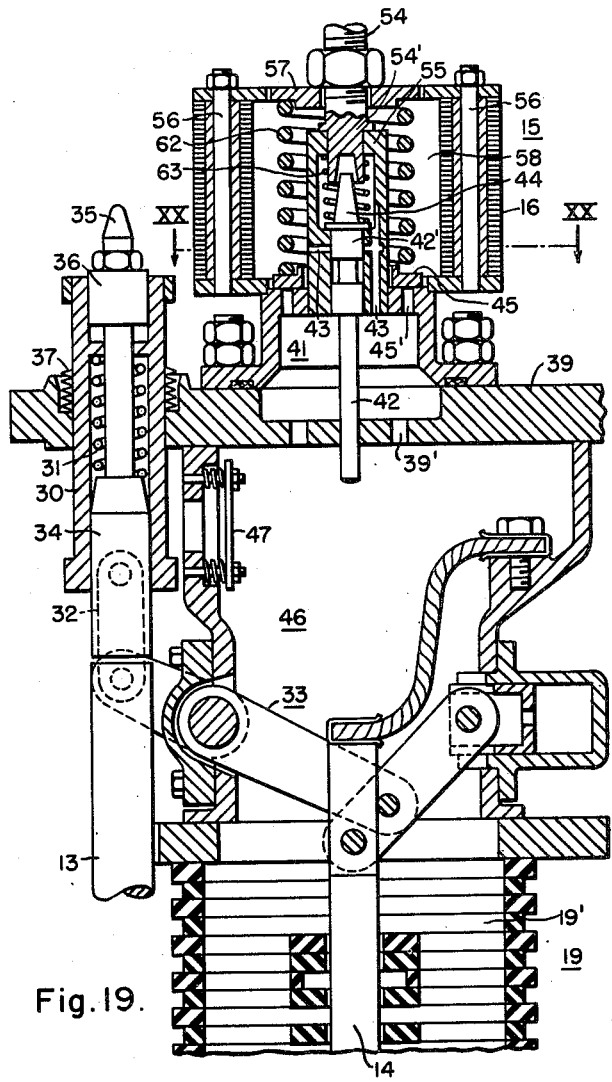
Fig. 19 is an enlarged fragmentary vertical sectional view taken through the upper portion of the arc-extinguishing unit of Fig. 7, illustrating the contact position and valve parts in the fully-closed circuit position of the interrupter.

Above this plate 39, as shown more particularly in Fig. 19, is provided a cavity or intermediate chamber 41, which is separated from the pressure-generating chamber 19' by a perforated diaphragm constituted by plate 39. This cavity, or intermediate chamber 41, because of the restriction created by the holes in the plate 39 to the passage of oil, accumulates the gas formed in the chamber, and reduces the lowering of pressure during the interruption and, consequently, attenuates slightly the pressure waves caused by the arcs or the oil pump 10.

On this chamber 41 is mounted the gas exhaust valve 15, which is contained in a plated iron cooler 16, more fully explained hereinafter. Valve 15 is actuated by upper contact 14, which, during the opening operation, reaches the end of its stroke and engages valve stem 42. This then opens exhaust openings 43 for the gases. At the end of this slide valve stem 42 is provided a shock absorber 44 for cushioning the impact caused by the movement of these parts. Around this valve 15 is mounted another safety valve, or over-pressure relief valve 45, which exhausts the gases formed in the interruption chamber when the pressure exceeds a predetermined value. Both valves 15 and 45 expand the gases in cooler 16 which helps to lower their high temperature. It should be noted that in the interior 46 of pressure-generating chamber 19' of arc-extinguishing unit 19 a valve 47 is provided. This valve 47 is normally open, but closes as soon as the pressure builds up to a certain value. This valve 47 serves the purpose of filling the chamber with oil when the pressure within the chamber drops below a predetermined value.

Figs. 10–18 show different detailed sections of the arc-extinguishing unit 19 with the pressure generating chamber 19' and the interrupting chamber 19''. Both of these chambers are made of insulating material and are separated by intermediate contact 60.

It will be apparent that the arc 70 established between the contacts 14 and 60, as indicated for purposes of illustration in Fig. 7, forces oil to flow downwardly through the two vertical flow channels 71 to a plurality of inlet openings 72 leading toward the interrupting passage 73. After passing through a plurality of orifices 74, the oil is exhausted from the extinguishing unit 19 through a plurality of exhaust passages 75 more clearly shown in Fig. 15. Extinction of the interrupting arc, not shown, soon follows.

Figure 11:
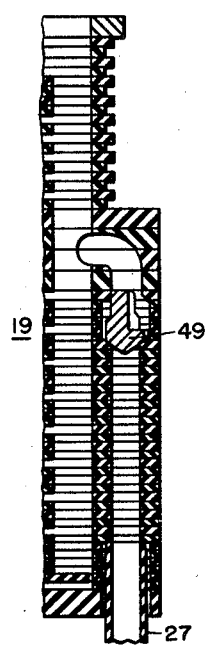
Fig. 11 shows a fragmentary section of the arc-extinguishing unit of Fig. 10, taken along the lines XI—XI of Fig. 13.
Figure 15:
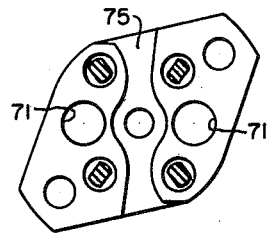
Fig. 15 is a sectional view taken along the line XV—XV of Fig. 10, looking in the direction of the arrows.
Figure 16:
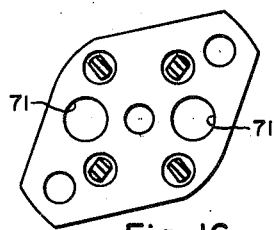
Fig. 16 is a sectional view taken along the line XVI—XVI of Fig. 10, looking in the direction of the arrows.
Figure 17:
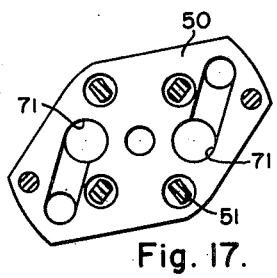
Fig. 17 is a sectional view taken along the line XVII—XVII of Fig. 10, looking in the direction of the arrows.
Figure 13:
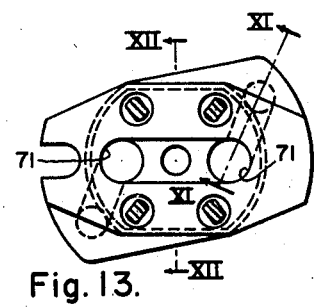
Fig. 13 is a plan view of the arc-extinguishing unit of Fig. 10, taken along the line XIII—XIII thereof, looking in the direction of the arrows.
Figure 12:
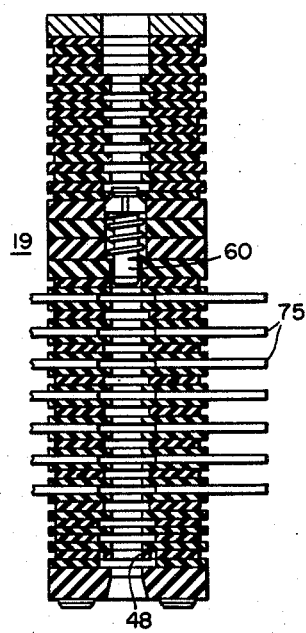
Fig. 12 shows a vertical cross sectional view of the arc-extinguishing unit illustrated in Fig. 10, taken along the line XII—XII of Fig. 13.
Figure 18:
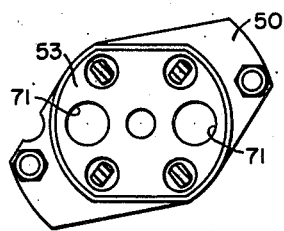
Fig. 18 is a sectional view taken along the line XVIII—XVIII of Fig. 10, looking in the direction of the arrows.

It will be noted from Fig. 11 that the two conduits 27 lead into the arc-extinguishing unit 19 adjacent the midportion thereof, being controlled by the valves 49 and operable during low pressure conditions within the extinguishing unit 19. Fig. 12 illustrates the exhaust passages 75.

Figure 14:
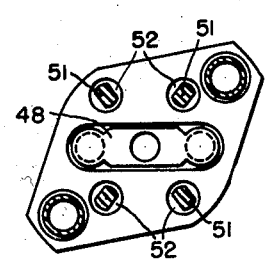
Fig. 14 is a sectional view taken along the line XIV—XIV of Fig. 10.

Attention is directed to valve 48, more clearly shown in Figs. 7 and 14, which is mounted in the lower portion of the extinguishing unit 19. This valve 48 helps in filling the unit 19 with oil and is biased, as shown in Fig. 7 to the open position. The two valves 49, more clearly shown in Fig. 11, mounted at the upper end of the two oil tubes 27 have the purpose of preventing the suction of contaminated oil from extinguishing unit 19 to the cylinder enclosure 25. During the opening movement they prevent the leakage of pressure out of the cell 19 into the cylinder 25 especially in the presence of high currents, and, consequently, high pressures within the cell 19.

Insulating plates 50 constituting part of the interrupting chamber 19'' are pressed together by rods 51 which have two lateral oil conduits 52 provided by milling the sides of the rods 51. The oil conduits 52 communicate with the external oil at their ends. Rods 51 pass through holes provided in plates 53 and forming pressure-generating chamber 19'. From the above description it is evident that a notable improvement has been obtained in the operation of the circuit breaker in a way which is simple and relatively inexpensive.

Figure 20:
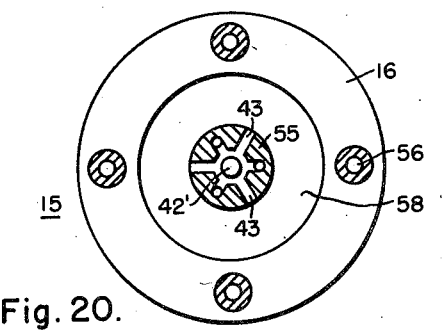
Fig. 20 is a sectional view taken along the line XX—XX of Fig. 19, looking in the direction of the arrows.

The cooler 16, more particularly shown in Figs. 19 and 20, will now be described. It will be noted that the cooler 16 is installed on the upper part of the breaker and is supported by the plate 39 having holes 39' therein. The holes 39' permit communication between the upper part of the pressure-generating chamber 19' with the intermediate chamber or cavity 41, this being part of the cooler and communicating with the cooler itself through holes 45'.

The cooler 16 is formed by a number of ring-shaped plates 16 of metal, for instance iron, which enclose a cooler chamber 58. This cooler chamber 58 is closed at the bottom by over-pressure valve ring 45 and at the top by disc 57. The plates 16 are held close together by bolts 56. Inside chamber 58 is placed a cylindrical valve body element 55, which has bores and holes 43. In the upper central part is screwed the end 54' of the threaded rod 54. At the bottom, the valve body 55 encloses element 42' of rod 42. As shown in Figs. 7 and 19 the movable contact 14, when it opens, hits the valve rod 42, which projects into the interior 46 of pressure-generating chamber 19'. Slide valve 42' ends with a truncated conic portion 44 which is sized to enter into a corresponding cavity of piece 54', but is kept at a distance by spring 63 so as to act as a shock absorber. Element or valve body 55 is itself surrounded by another spiral spring 62, which acts to keep the over-pressure valve 45 in closed position to maintain holes 45' closed.

The complete cooler is also formed by a deflector 17, mounted above cooler 16 inside of container 50 in which the cooler 16 is also placed. Deflector 17 serves the purpose of limiting escape of vapors and oil from cover 18 mounted on the container 50 and connected to the remaining parts of the breaker by a spring 20, as shown in Fig. 2. The spring 20 is adjusted so that the cover 18 should rise when the internal pressure has reached a predetermined value. Worthy of notice are valves 47 in the pressure-generating chamber 19' of arc-extinguishing unit 19, and valve 48 in the interrupting chamber 19". These valves, which are normally open, close as soon as the pressure starts to build up reasonably in the inside of the arc-extinguishing unit 19. They also serve for the purpose of filling up the chamber 19 and, therefore, aid its cooling, when the pressure within the chamber drops below a predetermined value due to the exhaustion of gases from the cooler 16.

Figure 21:
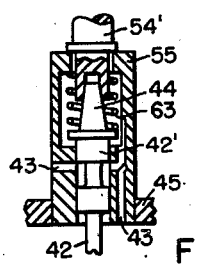
Fig. 21 is a fragmentary detailed view of a portion of the relief valve assembly illustrating the position of the several parts when the valve has been moved to the open position.
Figure 10:
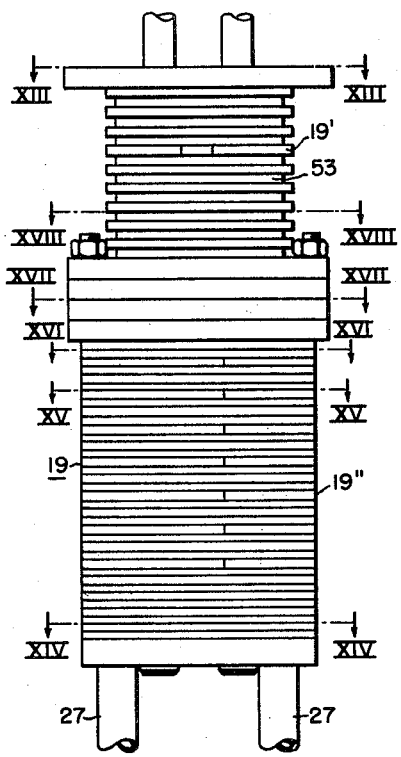
Fig. 10 shows an external view of the arc extinguishing unit.

The operation of the above-described valve arrangement occurs as follows: When in the position, as shown in Fig. 19, the valves of the cooler formed by elements 45 and 42' close any passage between intermediate chamber 41 and cooler chamber 58, which is disposed inside of the stacked plates 16. In this position the breaker is closed and there are neither pressures to be discharged nor oil to be cooled. When the breaker opens, the movable contact 14 will reach the position shown in Fig. 7, together with the parts connected thereto and valve 42' and shock absorber 44 will assume the position shown in the detailed view of Fig. 21. If the pressure in pressure-generating chamber 19' exceeds the value corresponding to the action of the spring 62, over-pressure valve 45 will also open and through holes 43 or holes 45' as well, the vapors generated by the arc effect which is formed in the arc-extinguishing unit 19 by the opening of contact 14 will pass into chamber 58 of the cooler. Here they will cool off and will pass, as vapors or liquid, through the plates 16 and will reach with a certain violence the interior of container 50. The deflector 17 prevents this oil from reaching the internal walls of the container 50 and lid or cover 18 with violence, and thereby prevents the oil from running down the external walls of the circuit breaker. Valves 47 and 48 open subsequently so completing the refill of the arc-extinguishing unit 19.

The constructional details of the various pieces forming the above-described cooler may vary according to necessity, as known by those skilled in the art.

Although we have shown and described a specific structure, it is to be clearly understood that the same was merely for the purpose of illustration, and that changes and modifications may readily be made therein by those skilled in the art, without departing from the spirit and scope of the invention.

We claim as our invention:

1. A circuit interrupter including an arc-extinguishing unit submerged in an arc-extinguishing liquid, a movable contact rod for establishing an arc within the arc-extinguishing unit, a piston device disposed below the arc-extinguishing unit, conduit means hydraulically interconnecting the piston device with the arc-extinguishing unit, a piston for forcing liquid out of the piston device through the conduit means and into the arc-extinguishing unit, means biasing the piston to move in a direction to force liquid into the arc-extinguishing unit, a separable connection between the contact rod and the piston, and the contact rod charging the piston during the closing operation against the opposition of said biasing means.

2. The combination in a liquid-break circuit interrupter of an arc-extinguishing unit, contact means associated with the arc-extinguishing unit including a movable contact rod, means submerging the arc-extinguishing unit in an arc-extinguishing liquid, a piston device positioned below the arc-extinguishing unit, a movable piston member associated with the piston device, conduit means hydraulically interconnecting the piston device with the arc-extinguishing unit, the movable contact rod moving within the piston device and serving to actuate the piston, and the contact rod having a separable connection with the piston member to separate therefrom during high current interruption.

3. A circuit interrupter including a container containing an arc-extinguishing liquid, an arc-extinguishing unit, contact means separable within the arc-extinguishing unit to establish an arc including an elongated movable contact rod, a piston device disposed in the liquid at a point where the liquid is of relatively good dielectric strength, a conduit hydraulically interconnecting the piston device with the arc-extinguishing unit, the piston device including a movable piston movable therein, a separable connection between the movable piston and the contact rod, and the elongated movable contact rod being movable within the piston device and causing the actuation of the piston.

4. A circuit interrupter including an arc-extinguishing unit, contact means for establishing an arc within the unit including a movable contact rod, a piston device including a movable piston member, a conduit hydraulically interconnecting the piston device with the arc-extinguishing unit, the movable contact rod being movable within the piston device and having a lost-motion connection with the piston member whereby during the closing operation the movable contact rod moves freely for a predetermined distance and then moves the piston member therewith.

5. The combination in a liquid-poor type of circuit interrupter, of an upstanding elongated container for liquid, an arc-extinguishing unit disposed at the upper end of the container and submerged in liquid, a movable contact rod for establishing an arc, a piston device separate from the arc-extinguishing unit and disposed below the arc-extinguishing unit in the liquid, a conduit hydraulically interconnecting the piston device with the arc-extinguishing unit, a movable piston member movable within the piston device and operable to force liquid through the conduit and into the arc-extinguishing unit, means biasing the movable piston member to move, and a separable connection between the movable contact rod and the piston member.

6. The combination in a liquid-poor type of circuit interrupter, of an upstanding elongated container for liquid, an arc-extinguishing unit disposed at the upper end of the container and submerged in liquid, contact means for the arc-extinguishing unit including an elongated movable contact rod for establishing an arc, a piston device separate from the arc-extinguishing unit and disposed below the arc-extinguishing unit in the liquid, a conduit hydraulically interconnecting the piston device with the arc-extinguishing unit, a movable piston member movable within the piston device, a lost-motion connection between the contact rod and the piston member, and the movable contact rod being operable through the piston device and actuating the piston member therein.

7. A circuit interrupter of the liquid-break type including an arc-extinguishing unit, means for establishing arcing within the arc-extinguishing unit, a piston device including a piston cylinder, a piston movable within the piston cylinder, means biasing the piston toward one end of the piston cylinder, a conduit hydraulically interconnecting said end of the piston cylinder with the arc-extinguishing unit, an inlet opening into the piston cylinder at said end of the piston cylinder, and a valve for controlling the admission of liquid into the piston cylinder through said inlet opening.

8. A circuit interrupter of the liquid-break type including an arc-extinguishing unit, means for establishing arcing within the arc-extinguishing unit, a piston device including a piston cylinder, a piston movable within the piston cylinder, means biasing the piston toward one end of the piston cylinder, a conduit hydraulically interconnecting said end of the piston cylinder with the arc-extinguishing unit, an inlet opening into the piston cylinder at said end of the piston cylinder, a valve for controlling the admission of liquid into the piston cylinder through said inlet opening, and a check valve disposed in the conduit to prevent back flow from the arc-extinguishing unit into the piston cylinder.

9. A circuit interrupter of the liquid-break type including an arc-extinguishing unit, means for establishing arcing within the arc-extinguishing unit, a piston device including a piston cylinder, a piston movable within the piston cylinder, means biasing the piston toward one end of the piston cylinder, a conduit hydraulically interconnecting said end of the piston cylinder with the arc-extinguishing unit, an inlet opening into the piston cylinder at said end of the piston cylinder, a valve for controlling the admission of liquid into the piston cylinder through said inlet opening, and a valve associated with the piston to facilitate the charging closing motion of the piston against the opposition of the biasing means.

10. A liquid-break circuit interrupter including an arc-extinguishing unit, contact means for establishing an arc within the unit including a movable contact rod, a piston device immersed in liquid including a piston cylinder, a piston member movable within the piston cylinder and carrying therewith a tubular portion having a restricted section, the movable contact rod being movable within the tubular portion and having an enlarged portion, and the enlarged portion of the movable contact rod cooperating with the restricted section of the tubular portion of the piston member to provide a cushioned interengagement between the piston and contact rod during the closing operation.

11. A liquid-break circuit interrupter including an arc-extinguishing unit, contact means for establishing an arc within the unit including a movable contact rod, a piston device immersed in liquid and disposed below the arc-extinguishing unit, a conduit hydraulically interconnecting the bottom of the piston device with the arc-extinguishing unit, an inlet opening leading into the piston device adjacent the lower end thereof, a check valve for controlling the inlet opening, a piston movable within the piston device, and the movable contact rod being movable through the piston device and charging the piston during the closing operation.

12. A circuit interrupter of the liquid-break type including an arc-extinguishing unit, means for establishing an arc within the arc-extinguishing unit, a piston device disposed below the arc-extinguishing device and having a piston member movable therein during the opening operation in a direction away from the arc-extinguishing unit, a conduit hydraulically connecting the bottom of the piston device with the arc-extinguishing unit, an inlet opening leading into the piston device at the bottom thereof, and a check valve for controlling the inlet opening.

13. A circuit interrupter of the liquid-break type including an arc-extinguishing unit, means for establishing arcing within the arc-extinguishing unit, a piston device including a piston cylinder, a piston movable within the piston cylinder, means biasing the piston toward one end of the piston cylinder, a conduit hydraulically interconnecting said end of the piston cylinder with the arc-extinguishing unit, an inlet opening into the piston cylinder at said end of the piston cylinder, a valve for controlling the admission of liquid into the piston cylinder through said inlet opening, and the valve being adjusted to provide a predetermined time delay before pumping of the liquid into the arc-extinguishing unit.

14. A circuit interrupter of the liquid-break type including an arc-extinguishing unit, means for establishing arcing within the arc-extinguishing unit, a piston device including a piston cylinder, a piston movable within the piston cylinder, means biasing the piston toward one end of the piston cylinder, a conduit hydraulically interconnecting said end of the piston cylinder with the arc-extinguishing unit, an inlet opening into the piston cylinder at said end of the piston cylinder, a valve for controlling the admission of liquid into the piston cylinder through said inlet opening, and the opposite end of the piston cylinder being perforated to permit free discharge of the liquid from this end of the piston cylinder during the closing operation.

15. The combination in a liquid-break circuit interrupter of an arc-extinguishing unit, contact means associated with the arc-extinguishing unit including a movable contact rod, means submerging the arc-extinguishing unit in an arc-extinguishing liquid, a piston device positioned below the arc-extinguishing unit, a movable piston member associated with the piston device, conduit means hydraulically interconnecting the piston device with the arc-extinguishing unit, means biasing the piston member to move, the movable contact rod moving within the piston device and serving to charge the piston, check valve means disposed in the conduit means to close during high pressure conditions within the arc-extinguishing unit, said check valve means opening during relatively low-pressure conditions within the unit to permit a flushing flow of liquid to flow from the piston device into the unit, a valve for controlling the exhausting of liquid out of the unit, and means responsive to the opening motion of the movable contact rod to effect opening of the valve whereby the valve is opened at the end of each opening operation to assist in the circulation of flushing liquid through the arc-extinguishing unit.

16. A circuit interrupter of the liquid-break type including an arc-extinguishing unit, a movable contact for establishing an arc within the unit, a valve for controlling the exhausting of liquid out of the unit, and means for causing the opening motion of the contact to effect the opening of the valve whereby the valve is opened at the end of each opening operation.

17. A circuit interrupter of the liquid-break type including an arc-extinguishing unit, contact means for establishing an arc within the unit including a movable contact, means defining a cooling chamber adjacent to the unit, a pair of valves controlling the flow of liquid into the cooling chamber from the unit, one of the valves being an over-pressure valve automatically actuated at a predetermined pressure, and the other valve being actuated by opening motion of the movable contact.

18. A circuit interrupter of the liquid-break type including an arc-extinguishing unit, a movable contact for establishing an arc within the unit, a valve for controlling the exhausting of liquid out of the unit, means for causing the opening motion of the contact to effect the opening of the valve whereby the valve is opened at the end of each opening operation, and means for cushioning the opening of the valve to prevent shock occurring during the opening operation.

19. The combination in a liquid-break circuit interrupter of an arc-extinguishing unit, said unit including a pressure-generating chamber, an intermediate chamber separated from the pressure-generating chamber by a perforated diaphragm, and a cooling chamber, a valve having a stem extending through the intermediate chamber and into the pressure-generating chamber, means including a movable contact for establishing an arc within the unit, the movable contact striking the stem near the end of the opening operation to effect thereby opening of the valve, the opening of the valve permitting the flow of liquid into the cooling chamber.

20. The combination in a liquid-break circuit interrupter of an arc-extinguishing unit, said unit including a pressure-generating chamber, an intermediate chamber separated from the pressure-generating chamber by a perforated diaphragm, and a cooling chamber, a valve having a stem extending through the intermediate chamber and into the pressure-generating chamber, means including a movable contact for establishing an arc within the unit, the movable contact striking the stem near the end of the opening operation to effect thereby opening of the valve, the opening of the valve permitting the flow of liquid into the cooling chamber, and an annular over-pressure valve associated with the cooling chamber and automatically actuated by excessive pressure within the pressure-generating chamber.

21. A circuit interrupter of the liquid-break type including an arc-extinguishing unit, contact means for establishing an arc within the unit including a movable contact, means defining a cooling chamber adjacent to the unit, a slide valve having a stem projecting into the unit and actuated near the end of the opening operation by the movable contact, a cylindrical valve body disposed within the cooling chamber and in which the slide valve operates, and means including the end of the slide valve for cushioning the opening stroke of the circuit interrupter.

References Cited in the file of this patent

UNITED STATES PATENTS

| 2,219,171 | Balachowsky | Oct. 22, 1940 |
| 2,372,589 | Leeds et al. | Mar. 27, 1945 |
| 2,386,611 | Ileman | Oct. 9, 1945 |
| 2,409,723 | Terry | Oct. 22, 1946 |
| 2,412,897 | MacNeill | Dec. 17, 1946 |
| 2,420,889 | Leeds | May 20, 1947 |
| 2,668,217 | Vogelsanger et al. | Feb. 2, 1954 |

FOREIGN PATENTS

| 317,429 | Great Britain | Aug. 16, 1929 |